(No Model.)
A. CALHOUN.
GRAIN SHOCKER.
No. 575,328. Patented Jan. 19, 1897.
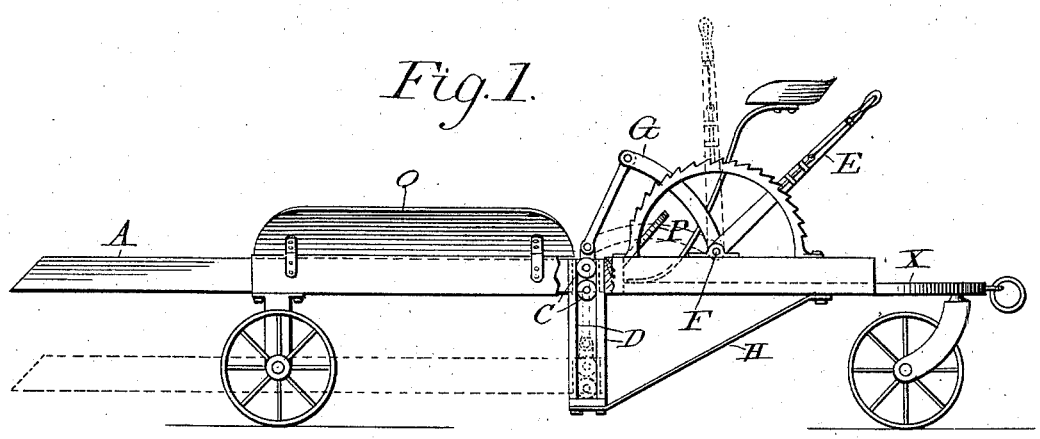
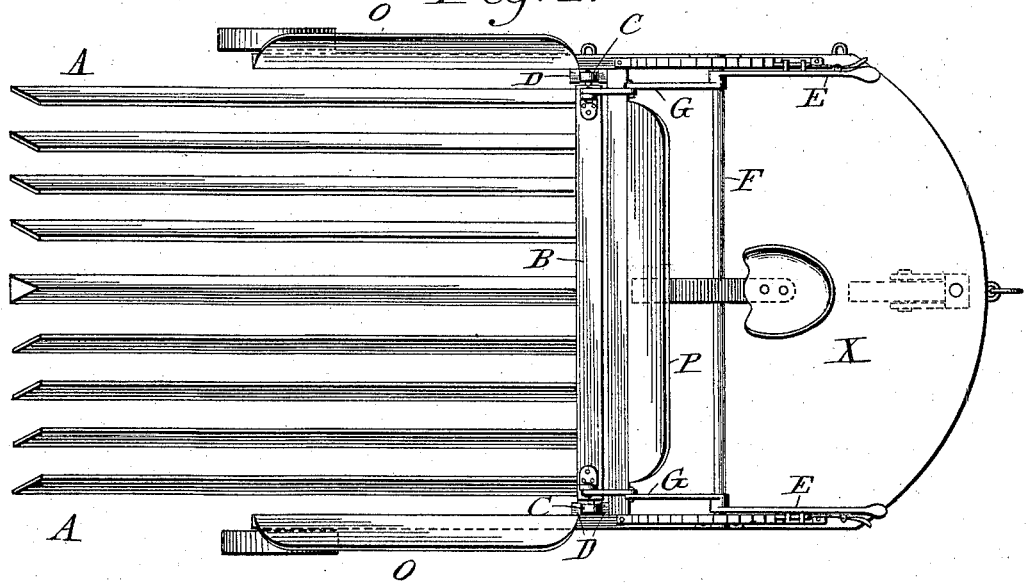
Witnesses:
H. M. Cunningham,
F. B. Tibbals
Inventor.
Alfred Calhoun

UNITED STATES PATENT OFFICE.

ALFRED CALHOUN, OF MILLERSBURG, OHIO.

GRAIN-SHOCKER.

SPECIFICATION forming part of Letters Patent No. 575,328, dated January 19, 1897.

Application filed January 31, 1896. Serial No. 577,648. (No model.)

*To all whom it may concern:*

Be it known that I, ALFRED CALHOUN, a citizen of the United States, residing at Millersburg, in the county of Holmes and State of Ohio, have invented a Grain-Shocker, a new and useful machine, of which the following is a specification.

The object of my invention is to enable one person to both gather and shock grain-bundles as they are discharged from the harvester. I attain this object by the mechanism illustrated in the accompanying drawings, which show a truck (upon which the operator rides) having a slatted platform attached to a head working on antifriction-rollers at either end in guides fastened to said truck, which platform is raised and lowered by a hand-lever with suitable attachments to the slatted-platform head.

Figure 1 is a side elevation of the grain-shocker in position for standing the shock upon it and showing in dotted lines the platform lowered to the ground in position to slide from underneath the shock. Fig. 2 shows the shocking-machine or grain-shocker attached to truck, showing top of oblique slatted platform upon which the bundles are shocked, also the levers to lower the shock to the ground.

X in Fig. 1 shows a truck having attached a slatted platform, as A A, with edged slats of sufficient number, length, and width attached to head B, the center slat the shape of an inverted (Λ) V, the others having their upper edges inclined to center at an angle of about forty-five degrees, more or less.

My object in having the slats edged is that the bundles may slip down more easily. Slats A A must be sharp at upper edge, or nearly so, so that they will penetrate the butts of the sheaves. Otherwise the sheaves would be hard to force down, as the binder packs the straw very tightly and the sheaf is generally bound near the butt, and by slanting upper edge toward the center obliquely they turn the butts of sheaves outward and draw the sheaves together at top ready for the cap-sheaf, an essential thing in shocking any kind of grain. Said head B has antifriction-rollers C C at each end, which run in upright guides D D.

Said slatted platform A A is raised and lowered by a hand-lever E with suitable connecting lifting-arms G G and shaft F, attached to head B.

O O represent slanting side boards of sufficient width, thickness, and length connected or fastened to rail of said truck at the sides of said slatted platform A A.

P is a board of proper shape attached or fastened to said head B, properly slanting with top toward the front of machine.

Operation: The said grain-shocker is to be attached to the frame on the binder side of the harvester, the operator riding on the truck and taking the grain-bundles as they are discharged from the binder, first, by taking a sheaf in each hand and chucking them down together on and near center of platform A A, so that the bottoms of the sheaves will be three or four inches below the bottom of the slats, then setting up in a similar way one or more sheaves at a time, as many as desired, usually eight or ten sheaves, then putting cap on, and the shock is complete. The platform A A when raised will be about one foot from the ground. When the shock is completed, the butts of the sheaves will be six inches or more from the ground. Then the lever E is grasped and the platform and shock lowered to the ground, when said slatted platform A A will slide out and leave the shock on the ground in a perfect shape. The operator then by the same lever E raises said platform A A in position for another shock.

The truck is to be hauled by an extra horse coupled to team hauling the harvester.

What I therefore claim as my invention, and desire to secure by Letters Patent, is—

In a grain-shocking machine, the combination of a platform composed of fore-and-aft slats, the slats on opposite sides of the median line of the platform being inclined downward and outward toward the wheels, guides D D and means for moving the slatted platform vertically in the guides, substantially as described.

ALFRED CALHOUN.

Witnesses:
A. E. WALTERS,
JAMES C. CALHOUN.